Patented Nov. 21, 1944

2,362,964

UNITED STATES PATENT OFFICE 2,362,964

RECOVERY ADDITION AGENT AND METHOD OF MAKING

Gregor S. Affleck, Pleasant Ridge, Mich.

No Drawing. Application August 2, 1940, Serial No. 350,120

12 Claims. (Cl. 117—102)

This invention relates to recovery addition agents or mixtures for use in coating material recovery processes and to improvements in such processes and is a continuation in part of and substitution for my pending application, Serial No. 290,491, filed August 16, 1939.

In the recovery of residual coating materials from the walls and air of spray chambers, such as for example that described in Patent No. 2,086,514, it is common to employ various washing and/or precipitating agent, such as for example water, mineral oil, and emulsions of soluble oil in water. In carrying out these methods, however, some difficulty has been found in obtaining complete removal or recovery of said coating materials from the spray chamber, probably due to the incomplete wetting of the materials by said agents, and, therefore, numerous attempts have been made to rectify this by using a wetting, emulsifying, or dispersing agent along with the washing or precipitating agent. For example, it is common to add mixtures of soda ash, caustic soda, and ground rosin in suitable amounts to the liquid or emulsion employed for recovering the enamel or like material constituting the coating substance. Such additions, however, tend to saponify the free fatty acids in the enamel. Moreover, some of the caustic soda, other alkali, or the soap formed thereby is taken up by the enamel or other coating material, and must be removed. This has been found difficult to accomplish, however, without at the same time removing portions of the coating substances.

Attempts have also been made to use ammoniacal graphite dispersions to assist in the removal of the coating materials. For example, the deflocculated graphite known as "prodag" has been used in proportions of about one gallon of the graphite mixture to from 500 to 1,000 gallons of water. In such instances, however, it is frequently necessary to remove the graphite due to its generally undesirable color, and this has not been easy due to the fact that the graphite has a strong tendency to adhere to the coating material sludge. Moreover, many of these graphite dispersions contain a deflocculating agent which is either malodorous in itself or decomposes to form malodorous substances.

It is accordingly an important object of the present invention to provide an addition agent or mixture for use in coating material recovery operations, which, when added to the recovery liquids or agents employed in such operations, permits a substantially complete recovery of said coating materials and yet does not require expensive removal operations to remove the same from the recovered materials.

A further object of the invention is to provide an addition agent of the type described which is not only inert to the coating materials being recovered, but entirely compatible therewith and lacking in disagreeable odor and therefore may be retained in the recovered materials as a filler or other ingredient thereof.

A further object of the invention is to provide an addition agent of the above described characteristics which is relatively inexpensive and at the same time easy to compound and to dissolve or disperse in the washing agent.

Additional objects of the invention are the provision in a coating material recovery medium of finely divided particles of earthly inert material in the presence of a wetting agent that is capable of causing the surfaces of the particles of coating material to be so wetted and their surface tension so reduced as to facilitate coating of such particles with the inert substance; the provision of a wetting agent of this kind which is effective in such dilute concentrations in water as to have no detrimental effect upon the recovered coating material; and the provision of inert earthly material which may be allowed to remain in the recovered coating material without producing significant detrimental effect thereon.

Still further objects and advantages of the invention will appear from the following description and appended claims. Before explaining in detail the present invention, however, it is to be understood that the phraseology or terminology employed herein is for the purpose of description and not of limitation, and it is not intended to limit the invention claimed herein beyond the requirements of the prior art.

The invention relates in general to the use of recovery addition agents of the type described which consist primarily of dispersions or suspensions of finely divided inert inorganic or earthly material in water, to which is preferably added small amounts of a gum and a wetting agent. The finely divided earthy materials, when added in the proportions hereinafter stated, tend to facilitate the complete removal and recovery of the coating ingredients with which they come in contact. Thus, it is believed they act both as an absorbent of liquid or gaseous ingredients and as a solid lubricant coating about the solid particles of the residual coating substances being recovered. Regardless of the manner in which they operate, however, it is known that they greatly assist in the substantially complete recovery of the desired materials by means of the washing liquid.

The wetting agent is added to wet the particles of paint or like coating material, thereby facilitating the coating of said particles by means of the finely divided inert material added, which would not otherwise take place satisfactorily. The gum is employed, on the other hand, to keep the earthy material dispersed or in suspension, which action is facilitated by selecting a gum having particles of the same electric charge as that of the earthy particles used.

It is frequently desirable to add a small amount of ammonia to the dispersions of the present invention to keep the same slightly alkaline and thereby prevent acid precipitation. The presence of ammonia in small quantities also prevents fermentation, which is apt to cause the formation of undesirable by-products. It should be understood, however, that the presence of ammonia is not required in every instance, as in some cases the dispersions are sufficiently neutral.

Although a wide variety of earthy materials may be used in accordance with the present invention, it is preferred to use a clayey material, such as common clay or bentonite, due to the fact that clay is relatively light in weight and stays in suspension better than other earthy substances. Moreover, clay is relatively cheap, and is to be preferred for that reason. Such substances as asbestine (hydrous magnesium silicate), fuller's earth, bauxite, infusorial earth, and barytes having also been used successfully, however, although the last mentioned substance is less suitable due to its relative heaviness. It is even possible to employ finely divided graphite or carbon black or the like in dispersed form under circumstances where the color of these materials will not interfere with the appearance of the recovered paint or other coating material.

Any suitable gum, or mixture of gums, may be used for the purpose of the invention, including such gums as gum karaya, gum tragacanth, gum acacia, gum benzoin, and dextrin (British gum). Moreover, such gelatinous substances as albumin and salts of alginic acid may be employed instead of or admixed with the gum, if desired. It is important, however, that the particles of the gum or gums selected have the same electric charge as the particles of earthy material, as this further facilitates the dispersion of the latter particles and tends to prevent any agglomeration.

A wide variety of wetting agents may also be employed, including such substances as sodium lauryl sulphate, ammonium soaps, sulphonated olive oil or castor oil, sodium salts or alkylated aryl compounds, alkylnaphthalene sulphate, and the material known in the trade as Aerosol O. T. which is an ester of a sulphonated di-carboxylic acid. The composition of this wetting agent is clearly set forth in United States Patent No. 2,028,091 in which it is broadly defined as "an ester of an aliphatic dibasic acid having the formula

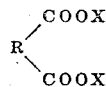

in which R is an aliphatic carbon chain containing at least one sulphonic group but free from other substituents, and X is hydrogen or an alcohol or phenol radical not connected by a carbon to carbon bond with R, at least one X being such an alcohol or phenol radical."

Examples of this compound are: dioctyl sodium sulphosuccinate, diamyl sodium sulphosuccinate, dilauryl sodium sulphosuccinate, dicapryl sodium sulphosuccinate, difuryl sodium sulphosuccinate and diethoxyethyl sulphopyrotartrate. The above esters can also be employed in the form of their other alkali metal salts or their amino ammonium or alkaloid salts, the preparation of these esters being clearly set forth in the above mentioned United States Patent No. 2,028,091. When Aerosol substance is employed, however, it is usually desirable to add a small portion of Carbitol (diethylene glycol monoethyl ether) to assist in dissolving the same, as Aerosol is relatively difficult to dissolve in water. The primary considerations in selecting a suitable wetting agent are whether it is compatible with the type of coating material being recovered and whether it is sufficiently cheap. Otherwise, it is relatively unimportant as to what particular agent or mixture of agents is used.

The alkali metal ester of a sulphonated dicarboxylic acid known as dioctyl sodium sulphosuccinate is particularly advantageous in recovering excess sprayed coating material for water solutions thereof of extremely dilute concentration have powerful wetting action both upon metal surfaces of spray booths and upon air-borne particles of excess coating material and therefore only insignificant quantities of the wetting agent are available to remain in the recovered product. The slight traces of this wetting agent which remain in the recovered product are compatible therewith and in fact assist in mixing of the final recovered and reconditioned product for re-use as a coating material for purposes identical to those for which it was originally intended.

The following is an example of a mixture which has been found most suitable for the purposes of the present invention:

|  | Pounds |
| --- | --- |
| Clay | 400 |
| Water | 264 |
| Gum karaya | 2.65 |
| Wetting agent | 3.5 |
| Ammonia | .7 |

In the above instance the wetting agent employed consisted of the following materials in the amounts given:

|  | Pounds |
| --- | --- |
| Aerosol O. T. (100%) | 2.1 |
| Carbitol | .5 |
| Water | .9 |

It is seen from the above that exceedingly small amounts of gum, wetting agent, and ammonia are sufficient for the purposes of the present invention, and that the dispersion consists primarily of earthy material and water.

If desired, the relative amounts of the earthy material and water may be varied rather widely. Thus, as little as 200 pounds of water may be used with 400 pounds of clay, or this amount of clay may be dispersed in as much as 1000 pounds of water. As the dispersion is extensively diluted with the washing liquid, during use, it is seen that the upper limit of the amount of water employed is relatively unimportant. However, it is desirable not to employ too much water in the initial dispersion formed due to the resulting increase in the cost of shipping and handling the material.

In preparing the addition agent for use, it is preferable to first mix the gum and water and to continue the mixing until the gum has had an opportunity to swell. Half of the amount of clay, or other earthy material to be used, is then added, after which the wetting agent is added. The ammonia is then added, and finally the rest of the clay. The entire mixture is then thoroughly stirred or agitated for about three hours, as it is important that the clay particles be thoroughly wetted by or dispersed in the remaining ingredients. One part of the above mixture in about 500 parts of water will remain dispersed for several days, and it is most effective in obtaining a substantially complete removal or recovery of the residual spray coating materials from the walls and from the air of the spray chamber.

A water solution of the above composition is particularly suitable for use as a recovery medium in a wet type of spray booth in which the excess sprayed coating material is directed toward a flowing curtain of the solution or toward a surface over which a film-like layer of the solution is flowed. The water of the solution serves to precipitate the "solids" of the air-borne particles of the excess sprayed coating material. The term "solids" as used herein and as conventionally employed in the surface coating art refers to those portions of the surface coating material which remain, either in their initial or chemically altered form, in a normally set deposit of such coating materials, including the non-volatile vehicle and pigment if the latter is present in the coating material.

The resulting precipitated solids may be collected by accumulating solids laden recovery medium in a tank or suitable receptacle and permitting rough gravitational separation thereof. The solids are then removed from the main bulk of the accumulated recovery material and the residual recovery medium may be eliminated in a press or by centrifugal action. The solids of some sprayed coating material are found to float on top of the liquid recovery medium in the form of a coherent mass of soft cheese or liver-like consistency while the solids of the other coating materials will settle to the bottom of the receptacle in a similar mass.

The thus recovered solids may be dissolved in a solvent of the same character as that from which they had previously been separated in order to produce surface coating material which is otherwise wasted. The sludge of the solid materials may be taken directly from the accumulating tanks and dissolved in a suitable solvent and the resulting mixture of the solution may be centrifuged to obtain the recovered coating material.

The wetting agent of the recovery medium serves a dual function particularly in a spray booth installation wherein a curtain of recovery medium is flowed over a wall or other surface in the booth toward which the excess coating material is discharged. It causes the surface over which the curtain flows to be thoroughly wetted so that the liquid curtain thereon is integral and not susceptible of penetration by the particles of excess coating material and the curtain therefore prevents the excess coating material from sticking to the surfaces against which it is directed. The outer surfaces of the particles of coating material which are projected into the liquid curtain are thoroughly wetted by the recovery medium and thus the inert material of the latter is permitted to coat the surfaces of the drops of excess sprayed coating material and to reduce the adhesive properties of these particles and their tendency to stick to the spray booth walls. The coating thus formed on the surfaces of the particles of excess sprayed coating material remains thereon only temporarily for it is absorbed upon standing in the accumulating tank and the particles are, therefore, permitted to accumulate in a substantially homogeneous mass of the type heretofore described. The inert material is of such character and present in such dilute concentration that the presence of the amount thereof which is absorbed by the recovered coating material has no significant effect upon the final recovered and reconditioned material.

Any suitable wetting agent may be employed in the liquid recovery medium so long as it serves the dual function of wetting the surfaces of the booth and wetting or breaking the surface tension of the precipitated particles of solids. The previously mentioned wetting agents are particularly suitable inasmuch as they have no significant detrimental effect upon the final recovered coating material when present in such small quantities as have been found to be ample to serve the dual functions.

The dispersions of the type described herein are not only thoroughly effective as addition agents for use in recovering coating materials, but are inert to such materials and impart no undesirable characteristics thereto. Moreover, they can be readily dissolved or dispersed in the washing agent used and are relatively inexpensive and easy to manufacture, and do not require special removal methods to separate any portion or residue thereof from the recovered material as they are completely compatible therewith.

Although the dispersions of the invention have been described solely as addition agents for use in washing liquids, it is also possible to employ them in their original concentrated condition as a protective coating for the walls of the spray chamber. Thus, by coating the walls prior to the spraying operations, the tendency of the particles of paint or the like to stick to the walls is largely avoided. Any paint which does stick, however, is readily removed by the washing liquid containing the addition agent described herein. A satisfactory coating of the spray chamber walls with the dispersion is made possible by the presence of the gum therein, which helps the dispersion to adhere properly.

What is claimed is:

1. The method of recovering excess coating material from spray chambers which comprises flowing over the walls and washing the air of said chambers with a dilute aqueous dispersion of a finely divided asbestine, to which has been added small amounts of a gum and a wetting agent and comprising dioctyl sodium sulphosuccinate.

2. The method of recovering excess coating material from spray chambers which comprises flowing over the walls and washing the air of said chambers with a dilute aqueous dispersion of a finely divided clay, to which has been added small amounts of a gum and a wetting agent and comprising dioctyl sodium sulphosuccinate.

3. An addition agent for use in coating material recovery methods which comprises an aqueous dispersion of a finely divided inert inorganic earthy solid, a gum having particles of the same electrical charge when dispersed as the dispersed particles of said solid, and a wetting agent comprising an ester of a sulphonated dicarboxylic acid in the form of its alkali metal salt.

4. An addition agent for use in coating material recovery methods which comprises an aqueous dispersion of a clay, gum karaya, and a wetting agent selected from the group of wetting agents consisting of sodium lauryl sulphate, ammonium soaps, alkylnaphthalene sulphate, sodium salts of alkylated aryl compounds, and esters of sulphonated dicarboxylic acid in the form of their alkali metal salts, said dispersion having sufficient ammonia present to render it slightly alkaline.

5. The process of recovering excess sprayed coating material from spray chambers which comprises collecting particles of said excess sprayed coating material by flowing over the walls and washing the air of said chamber with a dilute aqueous dispersion of finely divided inert clayey inorganic solid and a gum having the same electrical charge when dispersed as the particles of solid in a vehicle mainly comprising water having dissolved therein a wetting agent comprising an ester of a sulphonated dicarboxylic acid in the form of its alkali metal salt.

6. The process of recovering excess sprayed coating material from spray chambers which comprises collecting particles of said excess sprayed coating material by flowing over the walls and washing the air of said chamber with a dilute aqueous dispersion of finely divided inert clayey inorganic solid and a gum having the same electrical charge when dispersed as the dispersed particles of solid in a vehicle mainly comprising water having dissolved therein a wetting agent comprising an ester of a sulphonated dicarboxylic acid in the form of its alkali metal salt, and a solvent for said wetting agent comprising diethylene glycol monomethyl ether and aqueous ammonia.

7. The process of recovering excess sprayed coating material from spray chambers which comprises collecting particles of said excess sprayed coating material by flowing over the walls and washing the air of said chamber with a dilute aqueous dispersion of finely divided inert clayey inorganic solid and a gum having the same electrical charge when dispersed as said dispersed solid in a vehicle mainly comprising water having dissolved therein a wetting agent comprising dioctyl sodium sulphosuccinate.

8. The process of recovering the solids of excess sprayed coating material which comprises precipitating said solids by treatment with a dilute aqueous dispersion of finely divided inert inorganic clay-like material in a vehicle mainly comprising water having dissolved therein a wetting agent selected from the group of wetting agents consisting of sodium lauryl sulphate, ammonium soaps, sodium salts of aryl compounds, alkylnaphthalene sulphate and esters of a sulphonted dicarboxylic acid in the form of their alkali metal salts, and separating the resulting recovery product from the vehicle of said dispersion.

9. A composition for preventing the adhesion of particles of excess sprayed coating material from bonding to spray booth walls and other surfaces comprising a dispersion of solid inert clayey inorganic material and a gum having the same electrical charge when dispersed as said clayey material in a vehicle mainly comprising water having dissolved therein a wetting agent comprising an ester of a sulphonated dicarboxylic acid in the form of its alkali metal salt.

10. The process of recovering solids of excess sprayed coating material which comprises precipitating the solids of sprayed particles of said coating material and simultaneously coating the external surfaces of the resulting precipitated particles to render them non-adhesive to surfaces with which they contact by treating said particles of excess sprayed coating material with liquid recovery medium mainly comprising water having therein a suspension of inert inorganic earthy material and an agent for so wetting and reducing the tension of the surfaces of said precipitated particles of solids as to cause attraction of said inert material to the surfaces of said precipitated particles, said wetting agent comprising a compound selected from the group of compounds consisting of sodium lauryl sulphate, ammonium soaps, sodium salts of aryl compounds, alkyl naphthalene sulphate and esters of a sulphonated dicarboxylic acid in the form of their alkali metal salts and separating said precipitated solids from the liquid content of said recovery medium.

11. The process of recovering excess sprayed coating material from spray chambers which comprises precipitating the solids of air borne particles of excess sprayed coating material and simultaneously forming thereon temporary protective coatings of finely divided inert clayey inorganic solid particles in order to render said precipitated solids non-adhesive to the walls of said chamber and other surfaces with which they contact during collection of said solids while accommodating agglomeration of said solids after collection thereof, by washing the air of said chamber with a dilute aqueous dispersion of finely divided inert clayey inorganic particles and a gum having when dispersed the same electric charge as the latter for maintaining the inert particles in dispersion and a vehicle mainly comprising water having dissolved therein a wetting agent comprising an ester of a sulphonated dicarboxylic acid in the form of its alkali metal salt and adapted to expedite absorption of said protective coating by said particles of precipitated solids preparatory to agglomeration thereof.

12. A coating material recovery medium including a dilute dispersion in a vehicle mainly comprising water of finely divided inert clayey inorganic particles of solid matter compatible with and absorbable upon standing by said coating material, said inert particles being adapted to be deposited on particles of coating material to form a temporary protective coating thereon and to temporarily render said particles non-adhesive to each other and to surfaces with which they contact, a gum dispersed in said vehicle having particles of the same electrical charge when dispersed as the particles of inert solid for retaining said inert particles in suspension in said vehicle, and a wetting agent dissolved in said vehicle for promoting complete coverage of said particles of coating material by said inert solid particles, said wetting agent being adapted to facilitate absorption of said inert solid particles by said coating material upon standing after collection thereof and thus to promote agglomeration of collected particles of coating material said wetting agent comprising a compound selected from the group of compounds consisting of sodium lauryl sulphate, ammonium soaps, sodium salts of aryl compounds, alkyl naphthalene sulphate and esters of a sulphonated dicarboxylic acid in the form of their alkali metal salts.

GREGOR S. AFFLECK.